US010003909B2

(12) United States Patent
Altay et al.

(10) Patent No.: US 10,003,909 B2
(45) Date of Patent: Jun. 19, 2018

(54) WIRELESS BACKHAUL MANAGEMENT OF SENSOR NETWORKS VIA PROGRAMMABLE RAN CONTROLLER

(71) Applicant: ARGELA YAZILIM VE BILISIM TEKNOLOJILERI SAN. VE TIC. A.S., Istanbul (TR)

(72) Inventors: Can Altay, Istanbul (TR); Hakan Beyalan, Istanbul (TR); Erdogan Camcioglu, Istanbul (TR); Fevzi Durgan, Istanbul (TR); Oguz Oktay, Istanbul (TR)

(73) Assignee: NETSIA, INC., Sunnyvale, CA (US)

( * ) Notice: Subject to any disclaimer, the term of this patent is extended or adjusted under 35 U.S.C. 154(b) by 24 days.

(21) Appl. No.: 15/360,982

(22) Filed: Nov. 23, 2016

(65) Prior Publication Data

US 2018/0146322 A1    May 24, 2018

(51) Int. Cl.
*H04W 88/08* (2009.01)
*H04W 84/10* (2009.01)
*H04W 92/04* (2009.01)
*H04W 4/00* (2018.01)

(52) U.S. Cl.
CPC ............ *H04W 4/005* (2013.01); *H04W 84/10* (2013.01); *H04W 88/08* (2013.01); *H04W 92/045* (2013.01)

(58) Field of Classification Search
None
See application file for complete search history.

(56) References Cited

U.S. PATENT DOCUMENTS

| 9,794,368 | B2 * | 10/2017 | Kweon | H04L 67/306 |
|---|---|---|---|---|
| 2014/0341109 | A1 * | 11/2014 | Cartmell | H04L 45/308 370/328 |
| 2015/0063166 | A1 * | 3/2015 | Sif | G06F 9/45558 370/254 |
| 2015/0350914 | A1 * | 12/2015 | Baxley | H04W 12/08 726/11 |
| 2016/0227458 | A1 * | 8/2016 | Lee | H04W 36/165 |
| 2016/0241988 | A1 * | 8/2016 | Slevin | H04W 4/005 |
| 2017/0086011 | A1 * | 3/2017 | Neves | H04W 4/005 |
| 2017/0279957 | A1 * | 9/2017 | Abramson et al. | H04M 1/72577 |
| 2017/0286419 | A1 * | 10/2017 | Tang | G06F 9/44 |

OTHER PUBLICATIONS

Stevens et al., "IoT Management and Control DataModel Service," UPnP Version 1.0, Oct. 30, 2015, UPnP Forum, 110pgs.

* cited by examiner

*Primary Examiner* — Diane Lo
(74) *Attorney, Agent, or Firm* — IP Authority, LLC; Ramraj Soundararajan

(57) ABSTRACT

Means for enabling the integration of a Sensor Management System (SMS) to a programmable radio access network (ProgRAN) controller are described. The integration allows an efficient management of the radio access network capacity as the needs for the backhaul of the sensor network changes. When a sensor is turned on or programmed to a higher profile, which requires larger wireless backhaul bandwidth, the associated wireless link on the programmable RAN is instantly allocated with more network resources by the controller to accommodate the additional sensor traffic. One implementation could be a software application on a computer, which attaches to both the SMS and the RAN controller, and mediates the messaging in real-time between these two components.

20 Claims, 6 Drawing Sheets

WIRELESS BACKHAUL MANAGEMENT OF SENSOR NETWORKS VIA PROGRAMMABLE RAN CONTROLLER

BACKGROUND OF THE INVENTION

Field of Invention

The present invention relates to a system and method designed for remote management of wirelessly connected sensors and Internet of Things (IoT) with a 'transport profile based' sensor management system (SMS) as well as programmable wireless base stations (4G and beyond), managed by a controller. The sensors may be stationary or mobile and used for surveillance as well as other commercial purposes at indoor or outdoor settings. Ubiquitous wireless networks provide an efficient backhaul to connect the sensors to the associated storage server or analytics server. With this invention, limited wireless network resources are managed efficiently to accommodate the varying backhaul requirements of large number of sensors.

Discussion of Related Art

Any discussion of the prior art throughout the specification should in no way be considered as an admission that such prior art is widely known or forms part of common general knowledge in the field.

Software defined network (SDN) is a recent networking paradigm and a strong candidate to become the architecture of the future Internet. Fundamentally, the key concepts of SDN offer the basis for the system and method of this invention. A typical SDN is decoupled into two planes: a data plane comprised of 'forwarders', which perform data forwarding, and a control plane connecting all forwarders to a 'controller', which calculates routing (or flow) tables and sends them to the forwarders. Doing so, the packet forwarding and route calculation tasks are decoupled. The switches perform fast packet forwarding while the controller performs fast calculation of routes. Forwarders are mainly special-purpose hardware devices designed for packet switching, while the controller is software based and logically centralized.

The concepts of SDN are applicable to wire-line networks including data centers, wide area networks (WAN), and corporate networks. They are also recently extended to radio access networks (RANs), which comprise several base stations. In this document, the base station is also referred as eNodeB or eNB. Base stations provide the wireless transport path to cellular devices such as phones, computers and Internet of Things (IoT)s, manage roaming and interconnect devices to the core IP network.

Instead of looking at a RAN as a collection of independent base stations, the 'programmable RAN' paradigm argues that all base stations deployed in a geographical area can be abstracted as a virtual big-base station which is made up of distributed radio elements (i.e., the individual physical base stations). Instead of assuming that each base station has its own set of resources, programmable RAN (a) assumes that all neighboring base stations are allocating from a fixed set of shared radio resources which form a three-dimensional grid of space, time, and frequency slots; and (b) program them in a software defined fashion (as in an SDN) through a logically centralized radio access controller. With a control channel between each base station and the controller, base stations provide updated global view of the network to the controller, and allow the controller to communicate radio resource management decisions back to the base stations.

Programmable RAN (ProgRAN) controller allocates a group of resource blocks to each radio subscriber. LTE uses OFDMA, where radio resources are split into time and frequency slots, called 'resource blocks'. The channel quality and the interference for each subscriber can vary across these resource blocks; hence, they must be smartly shuffled between the contending subscribers. It also assigns transmit power values to each resource block at each base station while conforming to overall transmit power constraints. This major shift from the notion of a fixed base station configuration to a programmable configuration allows a much more efficient utilization of wireless network resources and instant reconfiguration to meet the needs of end devices.

Because Internet of Things (IoT) is anticipated to become ubiquitous in the 5G and beyond cellular architecture, the standards organizations such as UPnP forum developed a comprehensive architecture and specifications for management and control of IoT. The set of specifications include a detailed data model [ref: *UPnP IoT Management And Control Data Model Service*, UPnP Forum, Jul. 1, 2013] is implemented in the management and control systems of IoT including capabilities such as device discovery, configuration, and status reading.

More specific to this invention, when the IoT is a sensor, the Sensor Management System (SMS) includes capabilities such as configuration and control of sensors as defined by the aforementioned standards. Through standardized data model and the configuration management capabilities of the SMS, it can read and write data directly on each sensor in conjunction with the capability to store some data in the sensor and change its behavior according to said data. One of such data is the 'profile' or 'template' assigned to each sensor mainly prescribing the transport capabilities such as the resource block, i.e., the bandwidth (BW) or the Quality of Service (QoS) assigned to the sensor. Available commercial SMSs in the market expose an Application Programming Interface (API), using, for example, XML to manipulate the data stored in the SMS, and hence control the behavior of SMS towards each sensor.

The control connection between an SMS and a sensor is comprised of a so called 'backhaul wireless connection' connecting the sensor to a base station, a connection between the base station and the core IP network of the wireless operator, and finally the connection between the SMS and the core IP network. The SMS may be within a data center attached to the core IP network. In conjunction with the SMS, each sensor may be feeding data to a special storage server or an analytic server, which we will not distinguish from the SMS for simplicity in within the context of this patent.

Embodiments of the present invention are an improvement over prior art systems and methods.

SUMMARY OF THE INVENTION

In one embodiment, the present invention provides a wireless backhaul coordinator (WBC) comprising: (a) a first communication interface to communicate with a sensor management system (SMS), the SMS controlling at least one sensor; (b) a second communication interface to communicate with a programmable RAN (ProgRAN) controller, the ProgRAN controller communicating, via a control link, with at least one base station, and the at least one base station connected, via a wireless backhaul, to the at least one sensor; (c) a database storing information about the at least one sensor and the at least one base station; (d) a sensor bandwidth planner calculating and assigning a first wireless backhaul resource block corresponding to a first sensor profile to the at least one sensor in real-time; (e) a sensor manager responsible for collecting up-to-date information about the at least one sensor for storage in the database, and wherein the WBC: (1) receives a request from the SMS over the first communication interface to replace a first sensor profile associated with the at least one sensor with a second sensor profile, (2) calculates a second sensor profile to a second wireless backhaul resource block; (3) communicates with the ProgRAN controller to check when the second wireless backhaul resource block can be accommodated, and when the request can be accommodated, the ProgRAN controller setting up a second wireless backhaul resource block for the at least one sensor corresponding to the second sensor profile and in place of the first wireless backhaul resource, and (4) assigning the second sensor profile to the at least one sensor.

In another embodiment, the present invention provides a method as implemented in a wireless backhaul coordinator (WBC), the WBC comprising a first communication interface to communicate with a sensor management system (SMS) controlling at least one sensor, and a second communication interface to communicate with a programmable RAN (ProgRAN) controller, the ProgRAN controller communicating, via a control link, with at least one base station, and the at least one base station connected, via a wireless backhaul, to the at least one sensor, the method comprising: (a) receiving a request from the SMS over the first communication interface to replace a first sensor profile associated with the at least one sensor with a second sensor profile; (b) calculating a second sensor profile to a second wireless backhaul resource block; (c) communicating with the ProgRAN controller to check when the request can be accommodated, and when a second wireless backhaul resource block request can be accommodated, the ProgRAN controller setting up a second wireless backhaul resource block for the at least one sensor corresponding to the second sensor profile and in place of the first wireless backhaul resource; and (d) assigning the second sensor profile to the at least one sensor.

In yet another embodiment, the present invention provides an article of manufacture comprising non-transitory computer storage medium storing computer readable program code which, when executed by a processor in a single node, implements a method as realized in a wireless backhaul coordinator (WBC), the WBC comprising a first communication interface to communicate with a sensor management system (SMS) controlling at least one sensor, and a second communication interface to communicate with a programmable RAN (ProgRAN) controller, the ProgRAN controller communicating, via a control link, with at least one base station, and the at least one base station connected, via a wireless backhaul, to the at least one sensor, the computer storage medium comprising: (a) computer readable program code receiving a request from the SMS over the first communication interface to replace a first sensor profile associated with the at least one sensor with a second sensor profile; (b) computer readable program code calculating a second sensor profile to a second wireless backhaul resource block; (c) computer readable program code communicating with the ProgRAN controller to check when a second wireless backhaul resource block can be accommodated, and when the request can be accommodated, the ProgRAN controller setting up a second wireless backhaul resource block for the at least one sensor corresponding to the second sensor profile and in place of the first wireless backhaul resource; and (d) computer readable program code assigning the second sensor profile to the at least one sensor.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
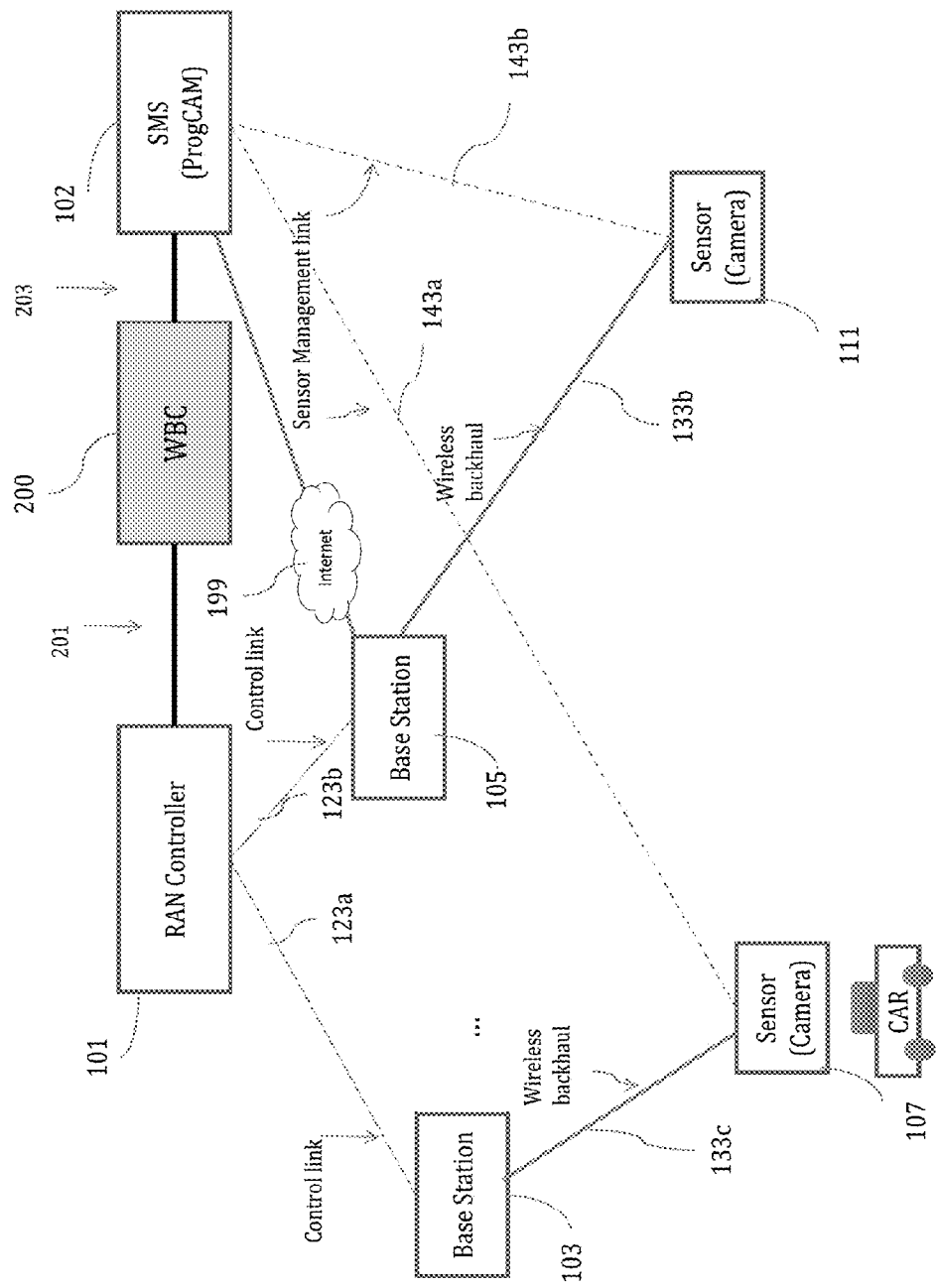
FIG. 1 is an exemplary sensor network for object tracking using video cameras.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., a base station, an eNodeB, the WBC, the SMS or the ProgRAN controller) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device such as a base station, a ProgRAN controller or an SMS is a piece of networking component, including hardware and software that communicatively interconnects with other equipment of the network (e.g., other network devices, and end systems). Base stations provide the function of access data transmission over wireless links for wireless terminals such as telephones, computers, sensors, etc., and provide the core network connectivity to other networking equipment such as gateways, routers and switches that exhibit multiple layer networking functions (e.g., routing, bridging, VLAN (virtual LAN) switching, layer-2 switching, Quality of Service, and/or subscriber management), and/or provide support for traffic coming from multiple application services (e.g., data, voice, and video). Any wireless device such as a sensor is generally identified by its type, ID, hardware address, also known as IMSI, and the Internet Protocol (IP) address.

Note while the illustrated examples in the specification discuss mainly a programmable radio access network (RAN) relying on the SDN paradigm of having a separate controller(s) to manage network resources in communications with a group of base stations, embodiments of the invention may also be implemented in other types of software defined radio networks. It can be implemented in any layered network architecture wherein there is a control infrastructure separated from wireless data transmission that can be instructed to change the allocation of resources to wireless end devices. Unless specified otherwise, the embodiments of the invention apply to any programmable or software defined RAN controller.

As defined in prior art, the wireless sensors change their sensing characteristics continuously as commanded by the SMS. When the SMS observes certain changes in the events related to a sensor, such as the sensor moving around in real-time, assigns a different operation model to that sensor for certain periods of time by triggering a new 'profile'. The wireless backhaul capacity requirement for a sensor highly depends on that assigned profile. Different profiles associated with the sensors and corresponding wireless backhaul properties may be pre-defined.

It is essential that the wireless backhaul capacity be managed in coordination with the SMS. For example, if the resolution of a sensor such as a surveillance video camera is increased by the SMS (because the surveyor wants to see more details), the associated wireless backhaul BW must also be instantly increased to accommodate the increased video data traffic bitrate, or a higher QoS must be provided. We assume that sensor feeds some data to surveyors, an analytic server or data storage server that are assumed to be associated or even integrated with SMS. Similarly, when the camera's video resolution is reduced by the SMS, the backhaul BW assigned to that video camera must be released so that it can be reallocated to other data traffic.

One main objective of the present invention is to provide the integration between a profile-based sensor management system (SMS) and the programmable Radio Access Network (RAN) controller as the wireless backhaul resource needs of sensors change in real-time. The goal is to efficiently manage the precious wireless backhaul capacity. Although the embodiments presented in this document focus mainly on wireless backhaul BW management for simplicity, the system and method apply to managing other configurable wireless network resource blocks pertaining to sensor management in general.

A key component of this invention is a mediation system that enables the intelligent communications between the SMS and the Programmable RAN (ProgRAN) controller for a real-time resource coordination and delivery. This mediation system is called a Wireless Backhaul Coordinator (WBC). Furthermore, a low delay, highly reliable and secure channel is established between the WBC and SMS, and the WBC and the ProgRAN controller for real-time information exchange.

WBC must support the APIs allowed by both the SMS (such as XML or JSON), and the NorthBound Interface (NBI) of a ProgRAN Controller (such as XML). One of the common APIs used at the NBI is the Representational State Transfer (REST) API. An application such as the WBC may use REST APIs to send an HTTP/HTTPS GET message using the Controller's IP address. That message would contain a URI string referencing the relevant network device and comprising an HTTP payload with a JSON (JavaScript Object Notation) header that has the proper parameters for a particular interface and statistic.

As a background, JSON is used in Javascript on the Internet as an alternative to XML for organizing data. Just like XML, JSON is language-independent and may be combined with C++, Java, Python, Lisp and many other languages. Unlike XML, however, JSON is simply a way to represent data structures, as opposed to a full markup language. JSON consists of "name: object" pairs and punctuation in the form of brackets, parentheses, semi-colons and colons, which we will be using in showing the messages between WBC and SMS, and WBC and Programmable RAN Controller. Each object is defined with an operator like "text:" or "image:" and then grouped with a value for that operator. The simple structure and absence of mathematical notation or algorithms, JSON is easy to understand and quickly mastered, even by users with limited formal programming experience, which has spurred adoption of the format as a quick, approachable way to create interactive pages.

Another key aspect of the invention is a high-level two-way messaging defined between SMS and Programmable RAN controller via the WBC to convey configuration commands and information such as 'increase backhaul capacity', 'decrease backhaul capacity', 'backhaul link failure', 'sensor failure', 'capacity unavailable', etc. The messages included in this document are merely for illustration of one embodiment, and not intended to be used with that specific name, semantics, syntax or even content.

While SMS and Programmable RAN controller may support different APIs, WBC performs the appropriate adaptations and translations from one interface to the other. Note that the communications between the SMS and WBC is about management of the sensor profile, while the communications between the ProgRAN controller and WBC is about management of wireless transport connection of each sensor while it's profile changes.

A third aspect of the invention is the decision sequence within the SMS and the ProgRAN controller. For example, the WBC must have the intelligence to calculate the backhaul requirements for a specific sensor's corresponding sensing profile and request the calculated backhaul BW from the ProgRAN controller before that new profile is actually actuated on the sensor. If the programmable RAN cannot provide the calculated BW, then a lower BW profile is assigned, or a failure is reported. If, however, the ProgRAN controller confirms that the requested backhaul BW can be delivered and makes the required adjustments to the backhaul link, the SMS then changes the profile on the sensor (i.e., actuates or starts operating the sensor at a mode that uses that level of capacity). Another example is that if a wireless backhaul link of a sensor fails the Programmable RAN controller informs SMS to make necessary changes (i.e., reporting the sensor connection as failed).

The WBC may be integrated with the SMS or the ProgRAN controller, i.e. running on the same server, or may be standalone. It may be collocated with one of the SMS or ProgRAN controller on the same LAN, or it can be connected to these servers via remote connections.

As an example, FIG. 1 illustrates a simple sensor network of two programmable surveillance video cameras, 107 and 111, which are controlled by Programmable Camera Controller (ProgCAM) 102, acting as an SMS. The cameras are connected to SMS 102 via a two programmable wireless base stations controlled by ProgRAN controller 101. The video camera 107 monitors the tracked object (car). Note that SMS 102 is able to monitor the health and integrity of the wireless backhaul by the information reported from the ProgRAN controller. If, for example, ProgRAN controller 101 reports that the capacity of the backhaul link cannot be maintained for certain reasons, SMS 102 adjusts the video recording characteristics of the active sensor (so called 'profile') to fit into the reported backhaul capacity. Note that configuration links 143a and 143b towards sensors 107 and 111, respectively, are carried over wireless backhaul connections 133a and 133b respectively, and through Internet 199 via connection 133c, which may traverse a core IP network of a wireless operator. Meanwhile, ProgRAN controller 101 controls base stations 103 and 105 using links 123a and 123b, respectively; wherein these links may be wireline or wireless.

Figure 2:
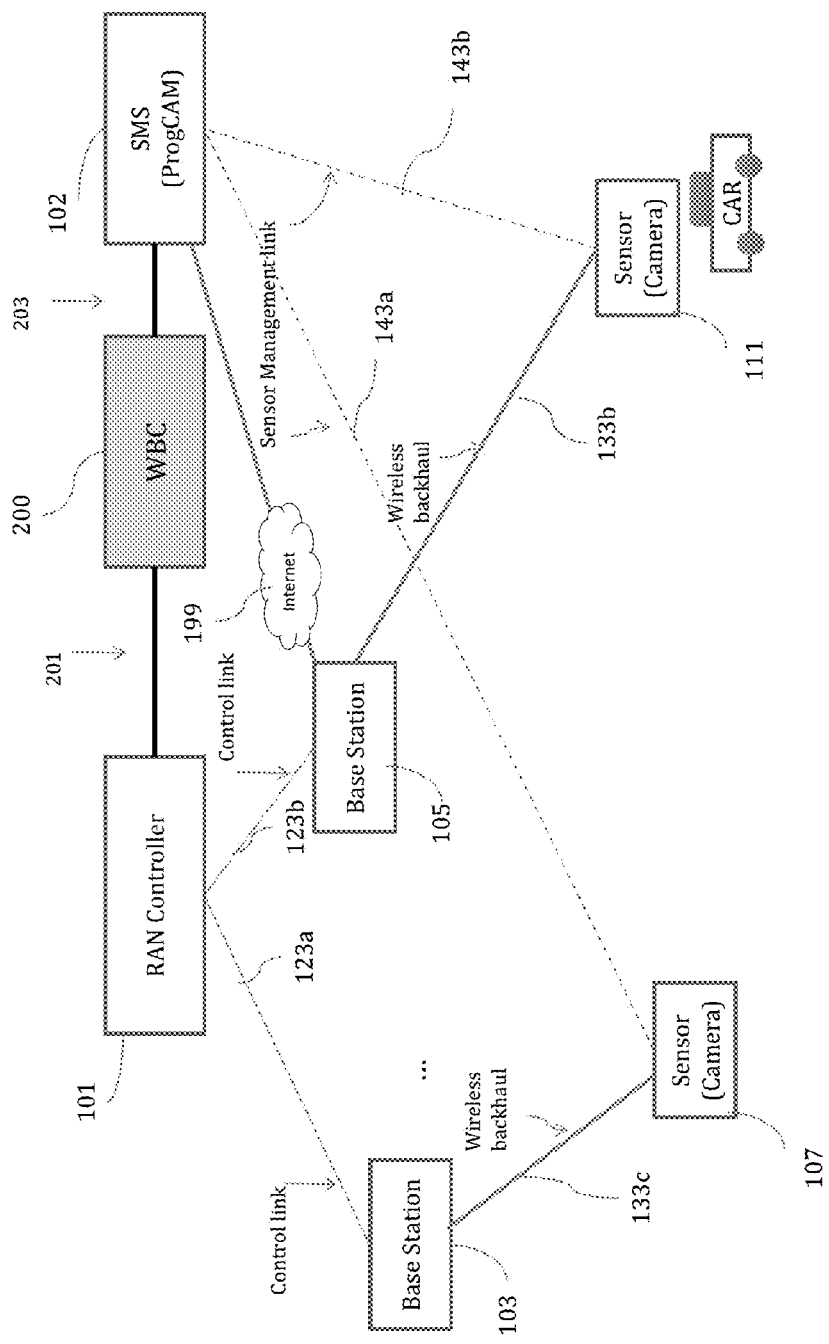
FIG. 2 depicts the system of the invention with a new position of a video camera.

The object (car) being tracked by SMS 102 changes position as in FIG. 2, and falls under another video camera. The SMS 102 hands over the task of recording the object to the other camera. When object moves under the camera 111, the 111 must be moved to a higher resolution profile in order to provide a better analytic data. SMS 102 exchanges this new configuration and communicates it with the ProgRAN controller and demands increased backhaul capacity for the new video camera positioned under base station 105. If ProgRAN controller 101 can fulfilled the capacity request, the new active camera is moved to a higher resolution profile. Meanwhile, the part or all of the redundant backhaul capacity allocated to camera 107 is now reported as redundant to ProgRAN controller 101 which may take it back and re-allocate to other sessions or links. In FIG. 2, such two-way configuration communications is achieved via WBC 200, the system of this invention, which mediates between RAN Controller 101 and SMS 102 via links 201 and 203, respectively.

Figure 3:
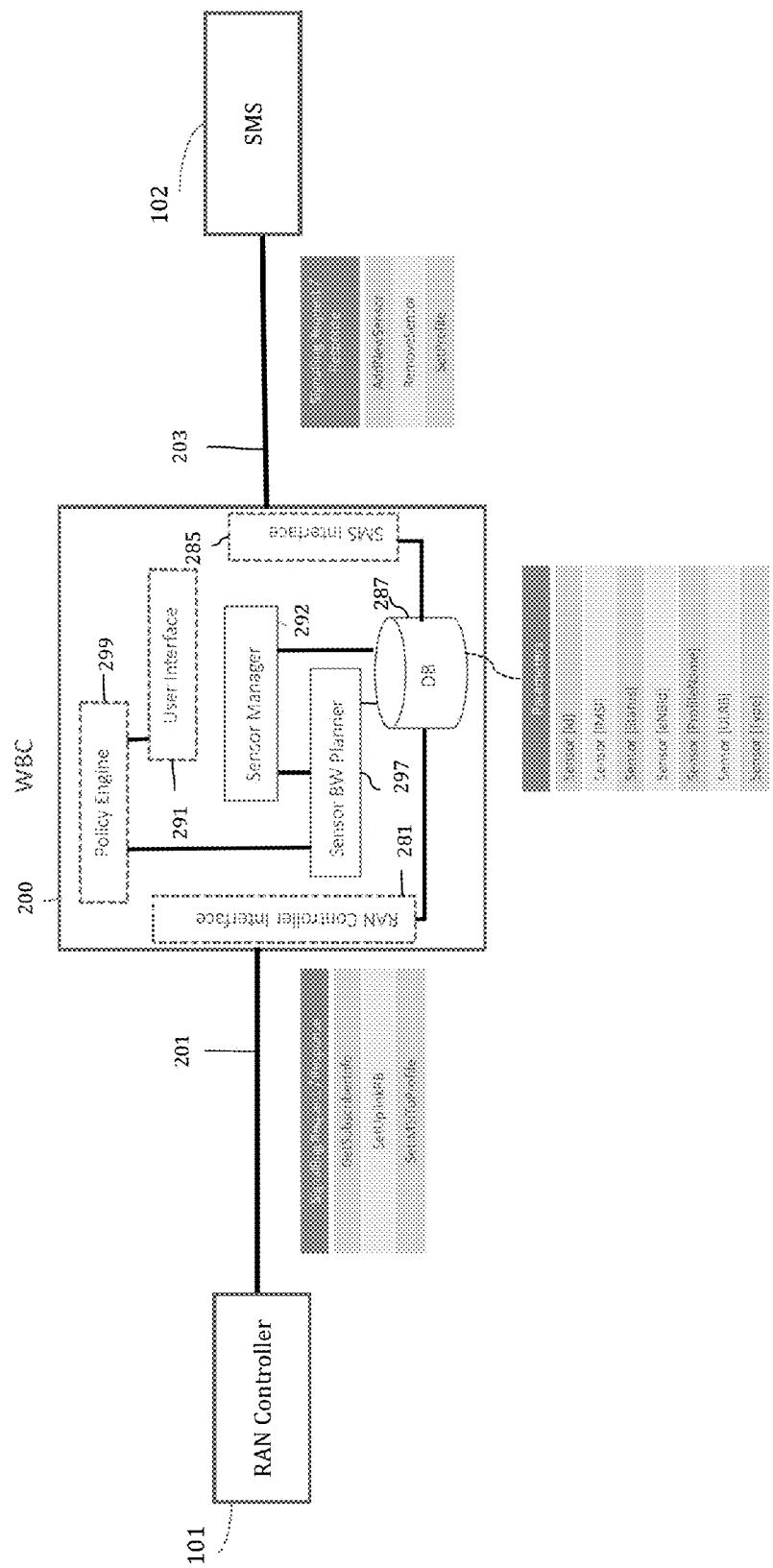
FIG. 3 illustrates the block diagram of an embodiment of WBC.

The block diagram of a simple embodiment of WBC 200 is shown in FIG. 3. The diagram also shows the key messages on interfaces 201 and 203, and the data elements in the database of WBC 200. The system is comprised of RAN Controller interface 281, SMS interface 285, user interface 291, Policy Engine 299, database 287, Sensor Manager 292 and Sensor BW Planner 297. Interface 201 to RAN controller supports at least three key messages:

GetSubscriberinfo: With this message, WBC gets network information about a sensor from the RAN controller.
1. SetULRB: With this message, WBC request ProgRAN controller to set the Up Link (aka wireless backhaul) resource block (BW) of a sensor.
2. SetIMSIToProfile: With this message, WBC assigns a profile to a sensor identified by an IMSI.

Interface 203 to SMS supports at least three key messages:
1. AddNewSensor: This message adds a new sensor to the network.
2. RemoveSensor: This message removes a sensor from the network.
3. SetProfile: This message sets a profile to a sensor.

There may be messages along interface 201 and 203 indicating failure or success of an action requested in a related message as well as other messages not listed here (for example, remove a group of sensors).

Database 287 has a WBC-specific data model, including at least the following information: SensorID, SensorType, SensorIMSI, SensorIPAddress, SensorStatus, eNBId, SensorProfileName, SensorULRB, for all sensors in the network. This data may be locally resident on the WBC, or in another embodiment, it may be obtained from the databases of other systems such as the SMS and the ProgRAN controller. Additionally, database 287 contains data elements associated with the allowed sensor profiles (minimum, medium and maximum), listing of all eNBs including their IDs, max BW supported, etc. Additionally, there may be 'policies' configured into the WBC by the system administrator or by the ProgRAN controller such as (i) maximum allowed number of sensors allowed per profile type per eNB, (ii) maximum BW that can be allocated to sensors per profile per eNB, etc. These and other policies are exercised each time a sensor's profile is modified.

Sensor BW Planner 297 is responsible of receiving new sensor profile change requests from SMS 102, and through dialog with RAN Controller 101, to deliver the required changes to the wireless backhaul link BW or resource block.

Sensor Manager 292 is responsible of collecting the most current information on each sensor in the sensor network and keeping Database 287 current.

Exemplary Message Flows

In this section, four different exemplary methods of the WBC are included to clarify its operations. The JSON notation is used to describe the sequence of messaging. The covered methods are as follows:
1. WBC system startup configuration.
2. Successfully adding a sensor to system.
3. Successfully changing a sensor's profile.
4. Policy violation: Exceeding maximum number of sensors for a profile.

1. WBC System Startup Configuration:

At the startup, WBC may extract information on eNBs and the network policies from the ProgRAN controller and information on sensor profiles directly from the SMS, or all this data can be manually configured using the user interface.
- ❖ Define profiles for each sensor type:
  Min. quality profile requirements (e.g., bitrate req. per sensor);
  Med. quality profile requirements (e.g., bitrate req. per sensor);
  High quality profile requirements (e.g., bitrate req. per sensor)
- ❖ Define all eNBs in the network:
  eNB ID ● Define all policies:
  Max. number of sensors allowed in each sensor profile per eNB;
  Max. total BW allowed for all sensors in each sensor profile per eNB
  Etc.

Figure 4:
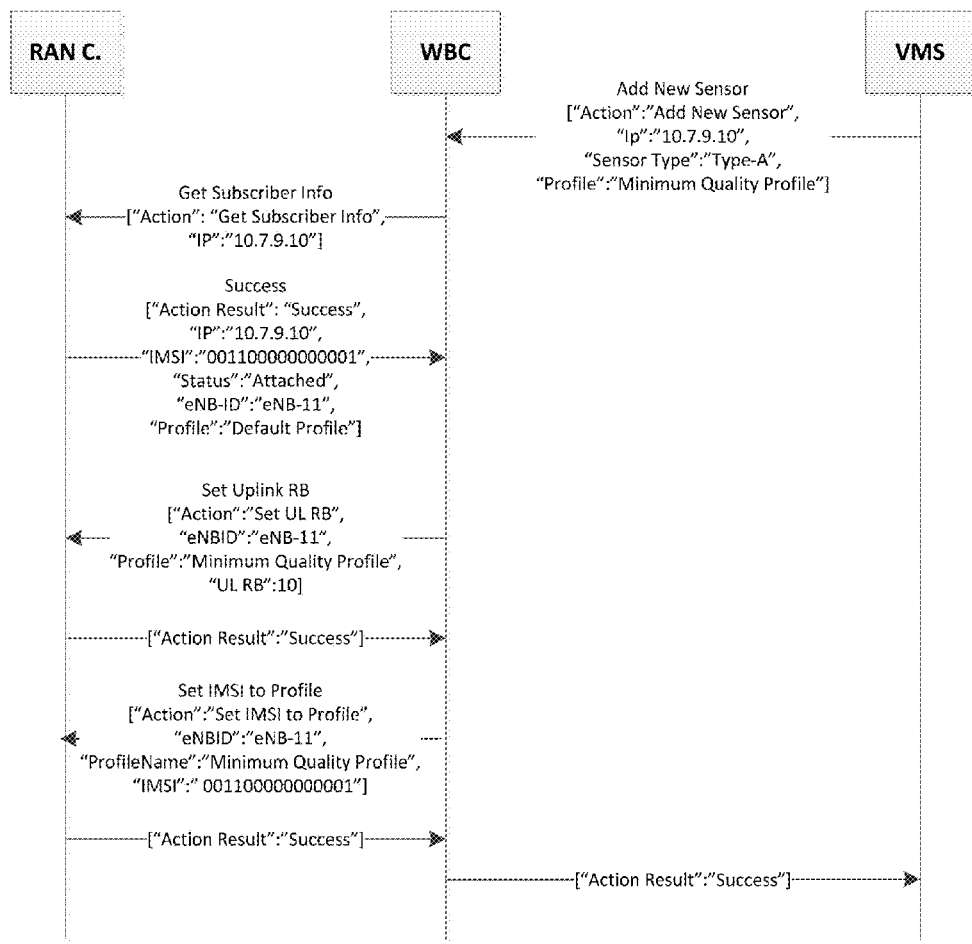
FIG. 4 depicts a method for adding a sensor to the system.

2. Adding a Sensor to Network:

When the sensor is powered on, it automatically attaches to an eNB and starts using the wireless backhaul. Thereafter, the sensor connects to its SMS, wherein the SMS reads the sensor's IP address and type, and initially assigns the minimum quality profile, if the sensor's addition to the network does not violate any of the aforementioned policies. The following is the possible message sequence, as illustrated in FIG. 4:

SMS→WBC:
  ["Action": "Add New Sensor",
    "IP": "10.7.9.10",
    "Sensor Type": "Type-A",
    "Profile": "Minimum Quality Profile"]
WBC→RAN Controller:
WBC requests the network specific information for the specified sensor such as the IMSI and the eNB it connects to:
  ["Action": "Get Subscriber Info",
    "IP": "10.7.9.10"],
RAN Controller→WBC:
The RAN Controller sends the requested information:
  ["Action Result": "Success",
    "IP": "10.7.9.10",
    "IMSI": "001100000000001",
    "Status": "Attached",
    "eNB-ID": "eNB-11"]
WBC stores this information in its database and checks the policies:
  ● Is {sensorCount[enodebID][sensorType][sensorPRofile]<maxsensorCount[enodebID][sensorType][sensorProfile]}?
If the answer is Yes, then WBC calculates the required BW demanded for the sensor to support the bitrate of requested specific sensor profile of the newly added sensor, adds it to previously assigned total BW for the profile, and checks to determine if the policy on max total BW per sensor type/profile is violated:
  ● NewTotalBW[enodebID][sensorType] [sensorProfile] =PreviousTotalBW[enodebID][sensorType] [sensorProfile]+RequiredBW
  ● Is {NewTotalBW [sensorType][sensorProfile]}<MaxTotalBW?
If the answer is Yes, then
  WBC→RAN Controller:
  WBC sets the wireless uplink bandwidth for the specified sensor profile, wherein ULRB is Uplink Resource Block:
    ["Action": "SetULRB",
      "eNBID": "eNB-11",
      "Profile": "Minimum Quality Profile",
      "UL RB": 10]
  RAN Controller→WBC:
  RAN Controller replies with the result of the action:
    ["Action Result":"Success"]
  WBC→RAN Controller:
  After successfully setting up the BW for the specified sensor and profile, the WBC now assigns and actuates the specified profile for the sensor:
    ["Action": "Set IMSI to Profile",
      "eNBID":"eNB-11",
      "ProfileName": "Minimum Quality Profile",
      "IMSI": "001100000000001"]
  RAN Controller→WBC:
  RAN Controller replies with the result of the action:
    ["Action Result":"Success"]
  WBC→SMS:
  After a successful operation, WBC replies with result of the action and increments the sensor counter for the specified profile:
    sensorCount[enodebID][sensorType] [sensorProfile]++["Action Result":"Success"]

Figure 5:
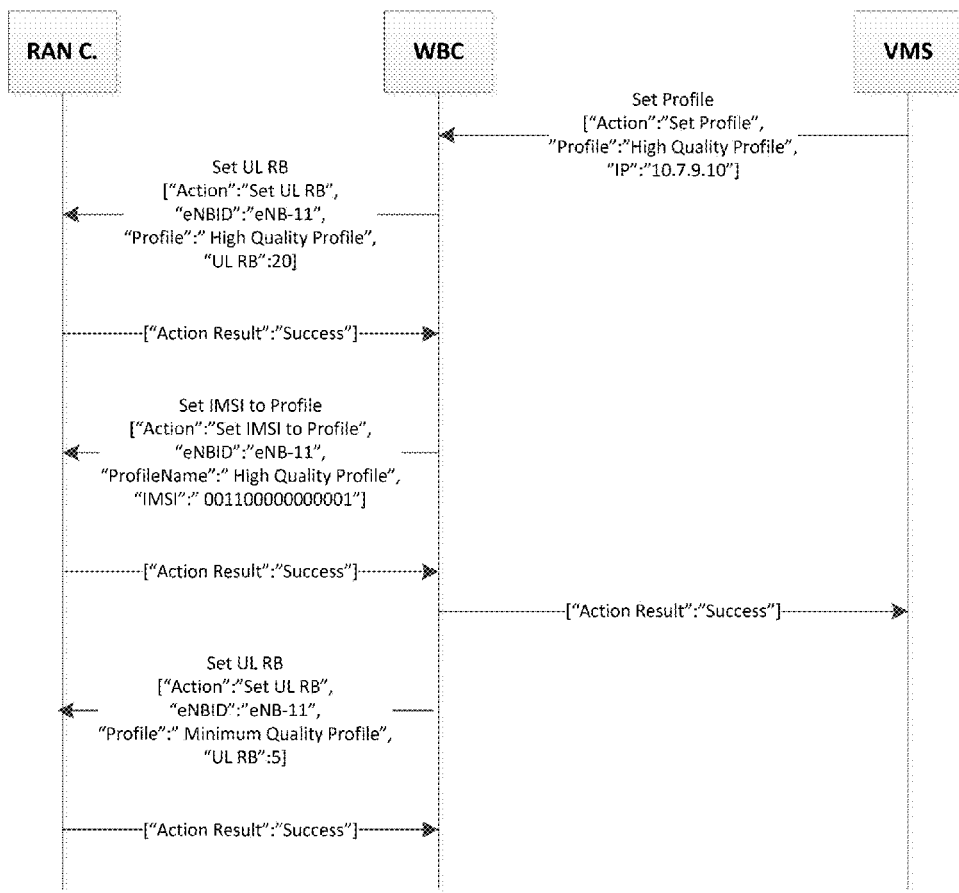
FIG. 5 depicts a method for setting a different sensor profiles.

3. Setting a Sensor to a Different Profile:

As illustrated in FIG. 5, the SMS sends to the WBC the sensor's IP address and the requested new profile to be set to High Quality Profile:
  SMS→WBC:
    ["Action": "Set Profile",
      "Profile": "High Quality Profile",
      "IP": "10.7.9.10"]
The WBC first checks it's policies for the number of profile users in the new profile:
  Is{sensorCount[enodebID][sensorType][newSensorProfile]<maxSensorCount[enodebID][sensorType][newSensorProfile]}?
If Yes, the WBC calculates the required bandwidth for the new profile:
  NewTotalBW[enodebID][sensorType][sensorProfile] =PreviousTotalBW[enodebID][sensorType][sensorProfile]+RequiredBW
  WBC→RAN Controller:
  WBC sets the Up-link Required BW for the specified profile:
    ["Action": "Set UL RB",
      "eNBID": "eNB-11",
      "Profile": "High Quality Profile",
      "UL RB": 20]
  RAN Controller→WBC:
  RAN Controller replies with the result of the action:
    ["Action Result":"Success"]
  WBC→RAN Controller:
After setting bandwidth for the specified profile successfully, WBC assigns the specified profile for the specified sensor:
  ["Action": "Set IMSI to Profile",
    "eNBID": "eNB-11",
    "ProfileName": "High Quality Profile",
    "IMSI": "001100000000001"]
  RAN Controller→WBC:
RAN Controller replies with the result of the action:
  ["Action Result":"Success"]
After a successful operation WBC replies with result of the action and modifies the sensor counters for the specified profile:
  sensorCount[enodebID][sensorType][newSensorProfile]++sensorCount[enodebID][sensorType][oldSensorProfile]–
  WBC→SMS:
    ["Action Result":"Success"]
  WBC→RAN Controller:
  WBC may also calculate and decrease the bandwidth of the old sensor profile by sending a "Set UL RB" message:
    ["Action": "Set UL RB",
      "eNBID": "eNB-11",
      "Profile": "Minimum Quality Profile",
      "UL RB": 5]

Figure 6:
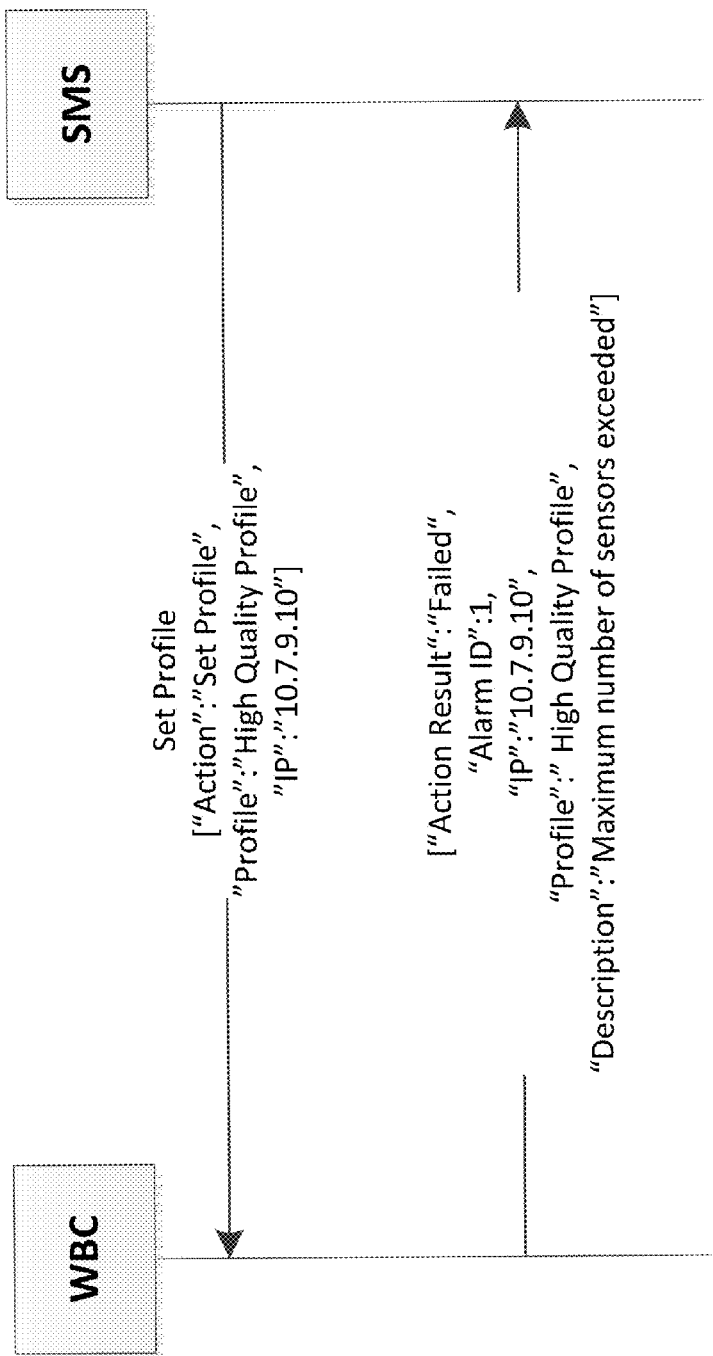
FIG. 6 shows a method of policy violation for the number of sensors for a profile.

RAN Controller→WBC:
RAN Controller replies with the result of the action:
["Action Result":"Success"]
4. Exceeding Maximum Number of Sensors for a Profile:
The SMS sends the sensor's IP address and the requested new profile to the WBC.
SMS→WBC:
["Action":"Set Profile"
"Profile":"High Quality Profile",
"IP":"10.7.9.10"]
The WBC checks to determine the policy of the maximum number of specific profile users in a sensor type in an eNB is violated or not:
Is {sensorCount[enodebID][sensorType][newSensorProfile]<maxSensorCount[enodebID][sensorType][newSensorProfile]}?
If the policy is violated as illustrated in FIG. 6, the WBC sends an alarm to SMS indicating the maximum number of sensor for the specified profile is violated:
["Action Result":"Failed",
"Alarm ID": 1,
"IP":"10.7.9.10",
"Profile":"High Quality Profile",
"Description":"Max. No. of sensors in HQ profile exceeded"]
Similar procedure with different alarm ID, Profile, and Description can be deployed for the failure of exceeding maximum BW of eNodeB or profile type.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a wireless backhaul management of sensor networks via programmable ran controller. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A wireless backhaul coordinator (WBC) comprising:
a first communication interface to communicate with a sensor management system (SMS), the SMS controlling at least one sensor;
a second communication interface to communicate with a programmable RAN (ProgRAN) controller, the ProgRAN controller communicating, via a control link, with at least one base station, and the at least one base station connected, via a wireless backhaul, to the at least one sensor;
a database storing information about the at least one sensor and the at least one base station;
a sensor bandwidth planner calculating and assigning a first wireless backhaul resource block corresponding to a first sensor profile to the at least one sensor in real-time;
a sensor manager responsible for collecting up-to-date information about the at least one sensor for storage in the database, and
wherein the WBC: (1) receives a request from the SMS over the first communication interface to replace a first sensor profile associated with the at least one sensor with a second sensor profile, (2) calculates a second sensor profile to a second wireless backhaul resource block; (3) communicates with the ProgRAN controller to check when the second wireless backhaul resource block can be accommodated, and when the request can be accommodated, the ProgRAN controller setting up a second wireless backhaul resource block for the at least one sensor corresponding to the second sensor profile and in place of the first wireless backhaul resource, and (4) assigning the second sensor profile to the at least one sensor.

2. The system of claim 1, wherein the WBC checks to determine if assigning the second sensor profile violates one or more network policies stored in the database.

3. The system of claim 2, wherein when the one or more network policies are violated, the WBC sends an error message to SMS that the request cannot be fulfilled.

4. The system of claim 2, wherein at least one of the network policies comprises maximum number of allowable sensors of a given profile type per base station.

5. The system of claim 2, wherein at least one of the network policies comprises maximum allowable bandwidth for a given profile type per base station.

6. The system of claim 2, wherein at least one of the network policies comprises maximum allowable bandwidth for sensors per base station.

7. The system of claim 1, wherein the first and second wireless backhaul resource blocks each forms a three-dimensional grid of space, time, and frequency slots signifying any of the following: bandwidth or quality of service.

8. The system of claim 1, wherein each of the first and second communication interfaces comprises a low-delay, highly-reliable, secure channel.

9. The system of claim 1, wherein each of the first and second communication interfaces are any of the following: XML interface, JSON interface, NorthBound interface (NBI), Representational State Transfer (REST) interface.

10. A method as implemented in a wireless backhaul coordinator (WBC), the WBC comprising a first communication interface to communicate with a sensor management system (SMS) controlling at least one sensor, and a second communication interface to communicate with a programmable RAN (ProgRAN) controller, the ProgRAN controller communicating, via a control link, with at least one base station, and the at least one base station connected, via a wireless backhaul, to the at least one sensor, the method comprising:
receiving a request from the SMS over the first communication interface to replace a first sensor profile associated with the at least one sensor with a second sensor profile;
calculating a second sensor profile to a second wireless backhaul resource block;
communicating with the ProgRAN controller to check when a second wireless backhaul resource block can be accommodated, and when the request can be accommodated, the ProgRAN controller setting up a second wireless backhaul resource block for the at least one sensor corresponding to the second sensor profile and in place of the first wireless backhaul resource; and assigning the second sensor profile to the at least one sensor.

11. The method of claim 10, wherein the WBC checks to determine if assigning the second sensor profile violates one or more network policies stored in the database.

12. The method of claim 11, wherein when the one or more network policies are violated, the WBC sends an error message to SMS that the request cannot be fulfilled.

13. The method of claim 11, wherein at least one of the network policies comprises maximum number of allowable sensors of a given profile type per base station.

14. The method of claim 11, wherein at least one of the network policies comprises maximum allowable bandwidth for a given profile type per base station.

15. The method of claim 11, wherein at least one of the network policies comprises maximum allowable bandwidth for sensors per base station.

16. The method of claim 10, wherein the first and second wireless backhaul resource blocks each forms a three-dimensional grid of space, time, and frequency slots signifying any of the following: bandwidth or quality of service.

17. The method of claim 10, wherein each of the first and second communication interfaces comprises a low-delay, highly-reliable, secure channel.

18. The method of claim 10, wherein each of the first and second communication interfaces are any of the following: XML interface, JSON interface, NorthBound interface (NBI), Representational State Transfer (REST) interface.

19. An article of manufacture comprising non-transitory computer storage medium storing computer readable program code which, when executed by a processor in a single node, implements a method as realized in a wireless backhaul coordinator (WBC), the WBC comprising a first communication interface to communicate with a sensor management system (SMS) controlling at least one sensor, and a second communication interface to communicate with a programmable RAN (ProgRAN) controller, the ProgRAN controller communicating, via a control link, with at least one base station, and the at least one base station connected, via a wireless backhaul, to the at least one sensor, the computer storage medium comprising:

computer readable program code receiving a request from the SMS over the first communication interface to replace a first sensor profile associated with the at least one sensor with a second sensor profile;

computer readable program code calculating a second sensor profile to a second wireless backhaul resource block;

computer readable program code communicating with the ProgRAN controller to check when the request can be accommodated, and when the request can be accommodated, the ProgRAN controller setting up a second wireless backhaul resource block for the at least one sensor corresponding to the second sensor profile and in place of the first wireless backhaul resource; and computer readable program code assigning the second sensor profile to the at least one sensor.

20. The article of manufacture of claim 19, wherein the computer storage medium further comprises computer readable program code checking to determine if assigning the second sensor profile violates one or more network policies stored in the database, where at least one of network policies comprises any of the following: maximum number of allowable sensors of a given profile type per base station, maximum allowable bandwidth for a given profile type per base station, and maximum allowable bandwidth for sensors per base station.

* * * * *